UNITED STATES PATENT OFFICE.

AXEL VILHELM HERMAN FREDERIK CHRISTIAN CLAUSON-KAAS, OF COPENHAGEN, DENMARK.

DURABLE ELASTIC ALBUMINATE AND ALBUMINATE-CONTAINING MATERIAL.

SPECIFICATION forming part of Letters Patent No. 724,810, dated April 7, 1903.

Application filed February 6, 1902. Serial No. 92,909. (No specimens.)

*To all whom it may concern:*

Be it known that I, AXEL VILHELM HERMAN FREDERIK CHRISTIAN CLAUSON-KAAS, architect, a citizen of the Kingdom of Denmark, and a resident of No. 17 Nytorv, Copenhagen, in the Kingdom of Denmark, have invented certain new and useful Improvements in Durable Elastic Albuminates and Albuminate-Containing Materials; and I do hereby declare the following to be a full, clear, and exact description of the invention, such as will enable others skilled in the art to which it appertains to make and use the same.

The albuminates of the alkaline metals and the alkaline earthy metals, as well as those of magnesium and zinc, which when freshly made possess a considerable adhesive and binding as well as covering and tightening capacity, have up to the present found but slight technical application because by drying they become hard and brittle. The same drawback appears in compounds containing an albuminate either as the main substance or as an admixture. It has been tried to remedy this by an addition of glycerin, which, however, partly enhances the price of the material, because the glycerin must be added in quite a considerable quantity in order to have any effect at all, and partly because it in course of time does not answer the purpose, inasmuch as it has a tendency again to exude after the hardening of the albuminate, and, moreover, the glycerin is easily washed out of the material when this is being exposed to rain or washing off. It has also been proposed to add oils and resin; but this has proved only to retard the drying, and consequently make the treated material of less use and without in the course of time preventing the albuminate from getting hard and brittle.

It has been succeeded in establishing as a fact that certain inorganical combinations have a marked capacity for making the said albuminates or albuminate-containing substances lastingly elastic.

The main thing here is not to treat the material with combinations which act hygroscopical, (chlorid of calcium and similar hygroscopical salts, for instance, prove quite unusable,) but, on the contrary, to add such more or less indifferent combinations which on account of their nature act enveloping and water-retaining.

Those combinations which are here taken into consideration are the naturally or artificially produced hydroxids of aluminium of the metals of the iron group (iron, chrome, manganese, nickel, cobalt, &c.) and of zinc.

In treatment of an albuminate alone—that is to say, before this is made a component part or binding means in other materials—gelatinous hydroxid of aluminium can be used, which, for instance, can be had by precipitating a solution of alum by ammonia or the hydroxid of aluminium in the shape of a rubber-like substance, which is produced by boiling it together with the sulfate or the phosphate of aluminium. The natural hydroxids, such as bauxite, can be used.

When it depends upon obtaining a durable elasticity of albuminate-containing materials—that is to say, objects, stuffs, or substances in which an albuminate acts as ingredient or binding means—the substance is first of all to be treated with a salt of aluminium, of mineral as well as of organic acids, or with a combination of aluminium with alkaline metals, or the alkaline earthy metals or magnesium, zinc, or the like, (the so-called "aluminates,") and thereupon the substance is treated with one or the other suitable reagent—for instance, lime-milk or alkaline carbonates or carbonic acid—which decomposes the salt of aluminium or the aluminate during the formation of the hydroxid of aluminium. This mode of treatment can, if desired, also be used in treatment of albuminates alone. The proportion of quantity between the hydrate and the treated albuminate depends upon the use for which this latter is intended and upon the elasticity which it is desired to attain.

When it is intended to use the albuminate as means of mixing up colors, about twenty per cent. hydroxid of aluminium is to be added.

If the albuminate has to be used for the impregnation of fabrics or for dressing or alike, it has to be mixed with about twenty-five per cent. hydroxid of aluminium.

Shall it finally serve as binding means for cellular stuffs—such as wool-offal, asbestos, paper fibers, animalic hair, cork refuse, and the like—about thirty per cent. hydroxid of aluminium is added.

In order to make the treated substance more even, a slight quantity of animalic glue can furthermore be added in connection with saccharates or glycerolates or with these last ingredients alone, as well as dyestuff, if desired. The albuminate thus treated must be kept in closed tanks until it has to be used.

By the use of hydroxid of iron, of manganese, chrome, and the like the process is mainly the same, only it must be remembered that the albuminate is hereby given a certain tone of color, an effect which does not occur when using hydroxid of zinc, which, however, is somewhat less active than the above-named hydroxids.

Having now particularly described and ascertained the nature of this invention and in what manner the same is to be performed, I declare that what I claim is—

1. The method of rendering albuminates lastingly flexible, which consists in mixing therewith the hydroxid of a metal, said hydroxid not capable of coagulating the albuminate, substantially as described.

2. The method of rendering albuminates lastingly flexible, which consists in mixing therewith a hydroxid of a metal of the iron group, substantially as described.

3. The method of rendering albuminates lastingly flexible, which consists in mixing therewith a hydroxid of aluminium, substantially as described.

4. The method of rendering albuminates lastingly flexible, which consists in mixing therewith a hydroxid of a metal and glue, said hydroxid not capable of coagulating the albuminate, substantially as described.

5. The method of rendering albuminates lastingly flexible, which consists in mixing therewith the hydroxids of a metal of the iron group, glue and a saccharate, substantially as described.

6. The method of rendering albuminates lastingly flexible, which consists in mixing them with a salt of a metal whose hydroxid does not coagulate the albuminate, and reacting on said salt with a suitable reagent to set free the hydroxid of said metal, substantially as described.

In testimony that I claim the foregoing as my invention I have signed my name in presence of two subscribing witnesses.

AXEL VILHELM HERMAN FREDERIK
        CHRISTIAN CLAUSON-KAAS.

Witnesses:
P. HOFMAN-BANG,
J. C. JACOBSEN.